United States Patent
Xu et al.

(10) Patent No.: US 9,490,938 B1
(45) Date of Patent: Nov. 8, 2016

(54) SYSTEMS AND METHODS FOR PERFORMING ITERATIVE INTERFERENCE CANCELLATION

(71) Applicant: Marvell International Ltd., Hamilton (BM)

(72) Inventors: Mingguang Xu, San Jose, CA (US); Yakun Sun, Sunnyvale, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/590,812

(22) Filed: Jan. 6, 2015

Related U.S. Application Data (60) Provisional application No. 61/923,866, filed on Jan. 6, 2014.

(51) Int. Cl.
| | |
|---|---|
| *H04L 1/00* | (2006.01) |
| *H04L 1/08* | (2006.01) |
| *H04J 11/00* | (2006.01) |
| *H04B 7/04* | (2006.01) |
| *H04L 25/03* | (2006.01) |

(52) U.S. Cl.
CPC ............ *H04L 1/0052* (2013.01); *H04L 1/0054* (2013.01); *H04L 1/08* (2013.01); *H04B 7/0413* (2013.01); *H04B 7/0417* (2013.01); *H04J 11/004* (2013.01); *H04L 1/0048* (2013.01); *H04L 25/03305* (2013.01)

(58) Field of Classification Search
CPC .......... H04L 1/0048; H04L 25/03305; H04B 7/0417; H04B 7/0413; H04J 11/004
See application file for complete search history.

(56) References Cited

U.S. PATENT DOCUMENTS

| | | | |
|---|---|---|---|
| 6,108,374 A | 8/2000 | Balachandran et al. | |
| 6,584,115 B1 | 6/2003 | Suzuki | |
| 7,173,979 B1 | 2/2007 | Badri et al. | |
| 7,209,522 B1 | 4/2007 | Shirali | |
| 7,373,582 B2 | 5/2008 | Park et al. | |
| 8,072,899 B2 | 12/2011 | Pan et al. | |
| 8,149,957 B2 | 4/2012 | Oh et al. | |
| 8,185,798 B2 | 5/2012 | Oteri et al. | |
| 8,301,956 B2 | 10/2012 | Pi et al. | |
| 8,335,286 B2 | 12/2012 | Mergen et al. | |
| 8,351,524 B2 | 1/2013 | Zhou | |
| 8,397,150 B1 | 3/2013 | Nieminen et al. | |
| 8,539,288 B1 | 9/2013 | Sun et al. | |
| 8,630,379 B1 | 1/2014 | Sun et al. | |
| 8,687,751 B1 * | 4/2014 | Lee ........................ | H04J 11/004 370/205 |
| 8,769,352 B1 | 7/2014 | Sun et al. | |
| 2005/0063378 A1 | 3/2005 | Kadous | |
| 2008/0034274 A1 | 2/2008 | Song et al. | |

(Continued)

OTHER PUBLICATIONS

Gerard J. Foschini, Layered space-time architecture for wireless communication in a fading environment when using multi-element antennas, Bell Laboratories Technical Journal, vol. 1 Autumn 1996, pp. 41-59.

*Primary Examiner* — Ross Varndell (57) ABSTRACT

Systems and methods are provided for performing iterative interference cancellation. The systems and methods include receiving a plurality of codewords and processing the plurality of codewords using a channel decoder to obtain a decoder output. The systems and methods further include determining, based on the decoder output, whether a stopping criterion is satisfied, and cancelling interference from the plurality of codewords based on the decoder output in response to determining that the stopping criterion is not satisfied.

20 Claims, 5 Drawing Sheets

(56) References Cited

U.S. PATENT DOCUMENTS

| | | | |
|---|---|---|---|
| 2008/0244162 A1* | 10/2008 | Mokhlesi | G11C 11/5642 711/103 |
| 2008/0297415 A1 | 12/2008 | Berens et al. | |
| 2009/0175214 A1* | 7/2009 | Sfar | H04B 7/15592 370/315 |
| 2009/0225889 A1 | 9/2009 | Tsai et al. | |
| 2010/0002598 A1 | 1/2010 | Pan et al. | |
| 2010/0271988 A1 | 10/2010 | Jia et al. | |
| 2011/0268019 A1 | 11/2011 | Tang et al. | |
| 2012/0069757 A1 | 3/2012 | Jiang et al. | |
| 2013/0287148 A1* | 10/2013 | Kwon | H04L 25/067 375/340 |
| 2014/0327559 A1 | 11/2014 | Xu et al. | |

* cited by examiner

SYSTEMS AND METHODS FOR PERFORMING ITERATIVE INTERFERENCE CANCELLATION

CROSS-REFERENCE TO RELATED APPLICATION

This disclosure claims the benefit under 35 U.S.C. §119(e) of U.S. Provisional Application No. 61/923,866, filed on Jan. 6, 2014, which is hereby incorporated herein by reference in its entirety.

FIELD OF USE

The present disclosure relates generally to systems and methods for performing iterative interference cancellation. More particularly, the disclosure discusses stopping criteria for determining when to terminate iterative interference cancellation techniques.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The disclosed technology relates to communications systems, and more particularly, to stopping criteria for determining when to terminate iterative interference cancellation techniques.

In a data transmission system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and/or receiver, and of their respective components.

Interference cancellation is a technique for improving the performance of a data transmission system. According to this technique, when decoding a plurality of codewords that interfere with one another, effects of partially decoded codewords are subtracted from a received signal vector to reduce or eliminate interference of the partially decoded codeword on the remaining codewords. For example, a received codeword that is associated with a small amount of corruption (e.g., due to favorable channel conditions or more robust encoding) may be decoded before other codewords that are associated with larger amounts of corruption. The codeword that is decoded first may then be subtracted to reduce or eliminate its interference on the codewords associated with the larger degree of corruption. This, in turn, facilitates the decoding of these codewords. In this way, the other codewords may experience less interference and are able to achieve a higher signal-to-interference-plus-noise ratio (SINR) than without interference cancellation.

Interference cancellation may be performed in a parallel or serial fashion. Serial interference cancellation schemes may also be referred to as successive interference cancellation techniques. Parallel interference cancellation techniques may process all of the received codewords concurrently to obtain "soft" decoding metrics that associate a likelihood of a decoding hypothesis with each bit in the codeword, such as the likelihood that a certain bit is a logical one rather than a logical zero. These likelihoods may be expressed in various ways such as, for example, log-likelihood ratios (LLRs). Parallel interference cancellation techniques may update the aforementioned likelihoods of a given codeword based on the likelihoods of other codewords. For example, if a first codeword has a high likelihood of having been correctly decoded, the interference of this codeword on other codewords may be subtracted out based on the preliminary decoding hypotheses of the first codeword. Parallel interference cancellation techniques are called "parallel" because codewords are processed at the same time, and for each codeword, the interference from many or all other codewords may be partially removed based on the preliminary decoding hypotheses for these codewords.

In contrast, for successive interference cancellation techniques, codewords are decoded in order. For example, a codeword that has a small degree of corruption may be decoded first, because it is most likely to result in an accurate decoding hypothesis. The impact of this first codeword is then subtracted from the received signal. Next, the second codeword may be decoded, and its impact may be subtracted from the received signal. This process continues until all codewords have been decoded. This technique is referred to as "serial" or "successive" interference cancellation because codewords are decoded one after the other.

The order in which codewords are decoded is an important design consideration. Successive interference cancellation methods may decode codewords in an order that is based on information that reflects long-term channel conditions or channel performance, such as a long-term signal-to-interference-plus-noise ratio. Successive interference cancellation technique may also take into account channel and interference conditions pertaining to a specific transmission attempt (e.g., in a specific subframe of the communication system).

SUMMARY OF THE DISCLOSURE

In accordance with an embodiment of the present disclosure, a method is provided for performing iterative interference cancellation. The method includes receiving a plurality of codewords and processing the plurality of codewords using a channel decoder to obtain a decoder output. The method may further include determining, based on the decoder output, whether a stopping criterion is satisfied and, in response to determining that the stopping criterion is not satisfied, cancelling interference from the plurality of codewords based on the decoder output.

In some implementations, cancelling the interference from the plurality of codewords may be based on at least one of parallel interference cancellation or successive interference cancellation.

In some implementations, processing the plurality of codewords using the channel decoder may be performed iteratively. The method may further include determining, based on a first decoder output of a first iteration, whether the stopping criterion is satisfied, and, in response to determining that the stopping criterion is not satisfied, processing the plurality of codewords using the channel decoder in a second iteration to obtain a second decoder output.

In some implementations, the decoder output may include a plurality of decoding metrics, and determining whether the stopping criterion is satisfied may include comparing the plurality of decoding metrics to one or more thresholds. Determining whether the stopping criterion is satisfied may further include determining that the stopping criterion is satisfied if more than a predetermined number of the plurality of decoding metrics exceeds the one or more thresholds.

In some implementations, the decoder output may be a first decoder output corresponding to a first iteration and determining whether the stopping criterion is satisfied may further include comparing the first decoder output corresponding to the first iteration with a second decoder output corresponding to a second iteration to obtain an accuracy improvement, wherein the second iteration precedes the first iteration. The method may further include determining whether the stopping criterion is satisfied based on whether the accuracy improvement exceeds a threshold.

In an embodiment of the present disclosure, a receiver is provided for performing iterative interference cancellation. The receiver may include storage circuitry configured to receive a plurality of codewords. The receiver may further include control circuitry configured to process the plurality of codewords using a channel decoder to obtain a decoder output, determine, based on the decoder output, whether a stopping criterion is satisfied, and cancel interference from the plurality of codewords based on the decoder output, in response to determining that the stopping criterion is not satisfied.

In some implementations, the control circuitry may further be configured to cancel the interference from the plurality of codewords based on at least one of parallel interference cancellation or successive interference cancellation.

In some implementations, the channel decoder may process the plurality of codewords iteratively, and the control circuitry may further be configured to determine, based on a first decoder output of a first iteration, whether the stopping criterion is satisfied, and process the plurality of codewords using the channel decoder in a second iteration to obtain a second decoder output, in response to determining that the stopping criterion is not satisfied.

In some implementations, the decoder output may include a plurality of decoding metrics, and the control circuitry may further be configured to compare the plurality of decoding metrics to one or more thresholds, and determine that the stopping criterion is satisfied if more than a predetermined number of the plurality of decoding metrics exceeds the one or more thresholds.

In some implementations, the decoder output may be a first decoder output corresponding to a first iteration, and the control circuitry may further be configured to compare the first decoder output corresponding to the first iteration with a second decoder output corresponding to a second iteration to obtain an accuracy improvement, wherein the second iteration precedes the first iteration, and determine, based on the plurality of aggregate decoding metrics, whether the stopping criterion is satisfied.

BRIEF DESCRIPTION OF THE DRAWINGS

The above and other aspects and potential advantages of the present disclosure will be apparent upon consideration of the following detailed description, taken in conjunction with the accompanying drawings, in which like reference characters refer to like parts throughout, and in which.

DETAILED DESCRIPTION

The present disclosure generally relates to performing iterative interference cancellation in a transmission system. In one aspect, the iterative decoding process may be terminated based on various stopping criteria.

Figure 1:
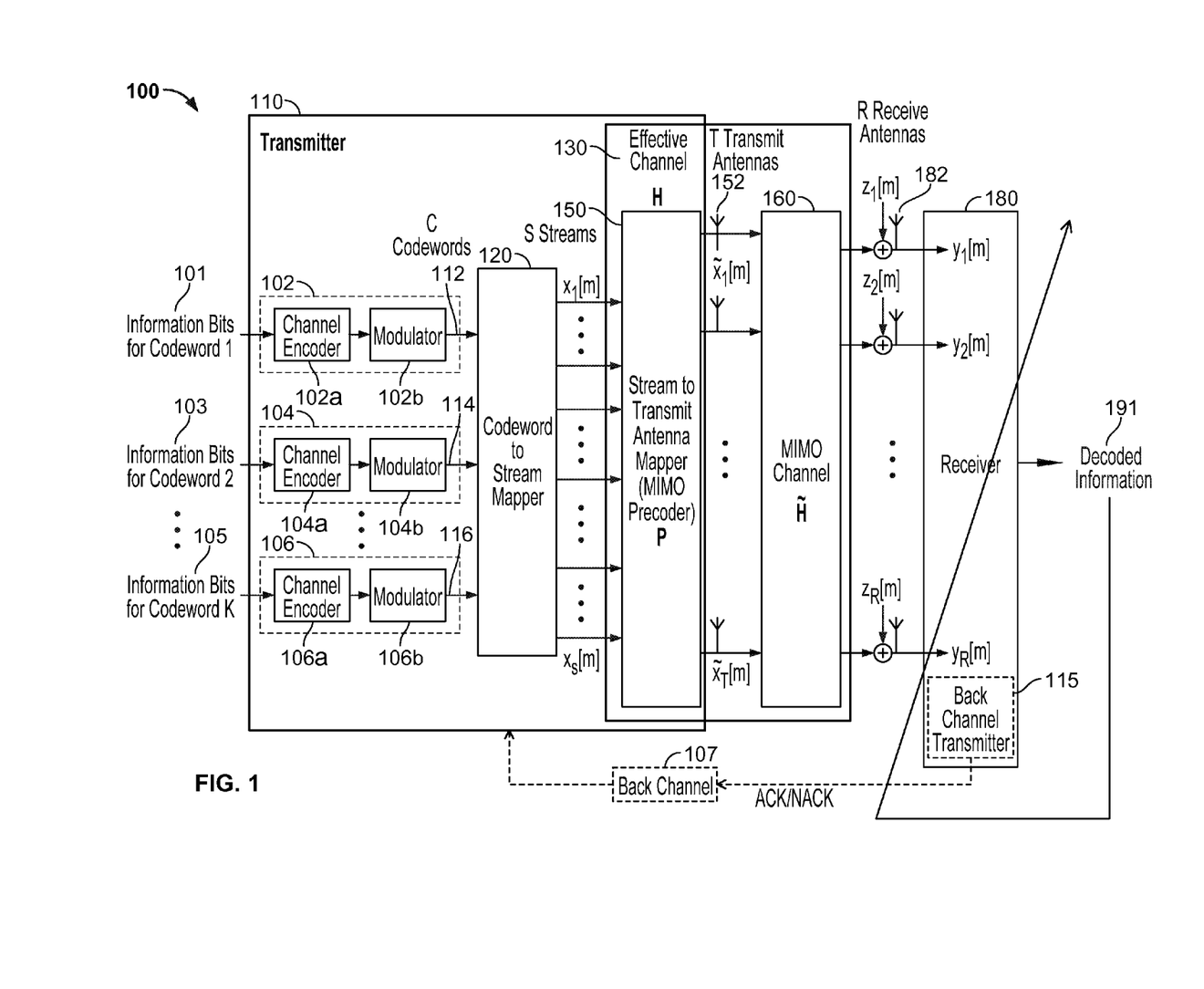
FIG. 1 is a high-level block diagram of a data transmission system, in accordance with some embodiments of the present disclosure.

FIG. 1 shows an illustration of a data transmission system 100 in accordance with some embodiments of the present disclosure. The system of FIG. 1 includes transmitter 110, channel 160, and receiver 180. In some embodiments, data to be transmitted may be divided between a large number of transmission systems such as system 100, where each system corresponds to one parallel transmission. For example, system 100 may correspond to a transmission on a portion of the system bandwidth (e.g., on one or more subcarriers) that carries data in a particular frequency range. In some embodiments the illustrated system may represent a wireless communication system. In these embodiments, transmitter 110 may be a wireless transmitter (e.g., a wireless router or a base station) and receiver 180 may be a wireless receiver (e.g., a mobile phone, laptop, or hand-held device). The components shown in transmitter 110 and receiver 180 may be implemented by a single integrated circuit (IC) or as separate components in a circuit board or implemented on a programmable logic device. These components may be implemented on separate devices or circuits and networked together.

Transmitter 110 may process K information bit sequences to produce K codewords using encoder and modulator blocks. For example, encoder and modulator blocks 102, 104, and 106 may process bit sequences 101, 103, and 105, to output codewords 112, 114, and 116, respectively. Although the present disclosure is described in terms of binary data, the bit sequences 101, 103, and 105 may be replaced with a sequence of non-binary digits or another type of information-containing symbol without departing from the scope of the present disclosure. In some embodiments, encoder and modulator blocks 102, 104, and 106 may include encoders 102a, 104a, and 106a, respectively. These blocks may employ error correction or error detection codes to encode bit sequences 101, 103, and 105. For example, encoders 102a, 104a, and 106a may encode bit sequences 101, 103, and 105 using convolutional codes, Turbo codes, LDPC codes, or other suitable codes. Error detection information, such as in the form of a cyclic redundancy check (CRC) may be added to the encoded bits. Encoder and modulator blocks 102, 104, and 106 may additionally include modulators 102b, 104b, and 106b, respectively, to modulate the encoded bit sequences associated with bit sequences 101, 103 and 105 based on any appropriate modulation scheme, such as quadrature amplitude modulation (QAM), pulse amplitude modulation (PAM), or phase shift keying (PSK). Although encoder and modulator blocks 102, 104, and 106 are illustrated as separate blocks, these blocks may be implemented as one or multiple encoder and modulator units.

Codeword to stream mapper 120 may process the K codewords output by the encoder and modulator blocks (e.g., encoder and modulator blocks 112, 114, and 116) to output S streams. These S streams are represented by coded values $x_1[m]$ through $x_S[m]$, where m is a transmission index associated with a transmission instance. A transmission instance may be defined in the time domain or in the frequency domain or any combination thereof. In some embodiments m may refer to the index of symbols sent in the time domain. In some embodiments, m may represent the index of a subcarrier. All S streams $x_1[m]$ though $x_S[m]$ may be collectively referred to as an S×1 stream vector x(m) such that:

$$x(m)=[x_1[m], \ldots, x_S[m]]^T.$$

Streams $x_1[m]$ through $x_S[m]$ may be input into MIMO precoder 150. MIMO precoder 150 may map streams $x_1[m]$ through $x_S[m]$ to transmit values $\tilde{x}_1[m]$ through $\tilde{x}_T[m]$, where T is the number of transmit antennas with T≥S. These transmit values may be grouped in a T×1 vector $\tilde{x}(m)$, which will be referred to hereinafter as transmit vector $\tilde{x}(m)$, where:

$$\tilde{x}(m)=[\tilde{x}_1[m], \ldots, \tilde{x}_T[m]]^T.$$

This mapping from stream vector x to transmit vector $\tilde{x}$ may be performed using a linear precoding operation. For example, MIMO precoder 150 may generate transmit vector $\tilde{x}(m)$ by multiplying stream vector x(m) by a T×S precoding matrix P, such that $$\tilde{x}(m)=P(m)x(m). \quad \text{EQ. (1)}$$

Precoding matrix P may be chosen to implement certain transmission schemes. In some embodiments, precoding matrix P may be selected such that multiple copies of the same data stream $x_1[m]$ are sent across a number of transmit antennas to improve the reliability of data transfer. This redundancy results in a higher chance of being able to use one or more of the received copies to reconstruct the transmitted signals at the receiver. Alternatively, the precoding matrix may be selected to transmit multiple data streams in parallel, such as to increase the achievable data rate of the communications link. Techniques such as closed-loop spatial multiplexing or other forms of beamforming may be employed.

Transmit values $\tilde{x}_1[m]$ through $\tilde{x}_T[m]$ may be transmitted using T transmit antennas at transmitter 110. For example, $\tilde{x}_1[m]$ may be transmitted through transmit antenna 152. During transmission $\tilde{x}_1[m]$ through $\tilde{x}_T[m]$ may be altered by a transmission medium, represented by channel 160, and additive noise sources $z_1[m]$ through $z_R[m]$. In a wireless communication system, channel 160 may be the physical space between the transmit and receive antennas, which obstructs and attenuates the transmitted signals due to at least time-varying multipath fading and shadowing effects. Additive noise sources $z_1[m]$ through $z_R[m]$ may, for example, be ambient electromagnetic interference. In some scenarios, noise sources $z_1[m]$ through $z_R[m]$ may be modeled as additive white Gaussian noise (AWGN) with zero mean. Also, in many applications, channel 160 may be time invariant, meaning that the properties of the channel do not substantially change over an appropriate time scale. In real-time data transmission systems, an appropriate time scale may be in the millisecond range.

Receiver 180 may receive signals $y_1[m]$ through $y_R[m]$ using R receive antennas such as receive antenna 182. These received signals will be collectively referred to as the m-th received vector y(m), or simply the received vector y, where:

$$y(m)=[y_1[m], \ldots, y_R[m]]^T.$$

Receiver 180 may include any suitable number of receive antennas, and therefore R may be any integer of at least S. Signals $y_1[m]$ through $y_R[m]$ may include information from one or more of signals $\tilde{x}_1[m]$ through $\tilde{x}_T[m]$ that have been attenuated and/or corrupted by channel 160 and noise sources $z_1[m]$ through $z_R[m]$. Receiver 180 may process the received signals to produce output bit sequence 191. The processing done by receiver 180 may include demodulation and decoding. Alternatively output bit sequence 191 may be directed to a decoder (not shown) external to receiver 180. Decoded information 191 may be used to adapt the receiver processing performed by receiver 180, as will be described in more detail below.

Because of the multiple transmit antennas of transmitter 110 and the possibly multiple receive antennas of receiver 180, channel 160 may sometimes be referred to as a MIMO channel with T inputs (from transmitter 110) and R outputs (from receiver 180), or simply a T×R MIMO channel. Due to channel properties, the signal received by each of the R receive antennas may be based on signals from multiple transmit antennas. In particular, a signal received by each receive antenna may be a linear combination of the signals provided by the transmit antennas. Thus, in matrix form, the m-th received vector y(m) may be modeled by:

$$y(m)=\tilde{H}(m)\tilde{x}(m)+z(m), m=1, \ldots, M, \quad \text{EQ. (λ)}$$

where M is the total number of received coded symbol vectors, y is the R×1 received vector representing the signals received by the R receive antennas of receiver 180, and $\tilde{H}$ is a T×R matrix representing the effect of channel 160 on transmit vector $\tilde{x}$ and may sometimes be referred to as a channel response matrix. Vector $\tilde{x}$ is a T×1 vector containing the transmit values transmitted by the T transmit antennas of transmitter 110, and z is an R×1 signal vector representing additive noise, where $$z(m)=[z_1[m], \ldots, z_R[m]]^T.$$

By substituting EQ. 1 into EQ. 2, one can compute an effective transmission channel relating the stream vector x to the received vector y as follows:

$$y(m)=\tilde{H}(m)P(m)x(m)+z(m)=H(m)x(m)+z(m), \quad \text{EQ. (3)}$$

where $\tilde{H}(m)$ represents the actual channel characteristics used in channel 160 and $$H(m)=\tilde{H}(m)P(m)=[h_1[m], \ldots, h_S[m]]$$

is an R×S matrix representing the effective transmission channel as modified by precoder 150. In some embodiments, the precoding matrix P can be chosen such that an effective transmission channel H(m) is created that maximizes the diversity gain of the system. For example, precoding matrix P may be chosen to change the apparent characteristics of the channel so that the effective channel matrix is closer to an orthogonal matrix than the actual channel matrix. Precoding matrix P may be a Givens rotation matrix, a Vandermonde matrix, a Fourier matrix, a Hadamard matrix, or any other suitable type of matrix.

Each codeword, e.g., codeword 112, may be mapped to a set of streams $x_{i_1}[m]$ through $x_{i_{c(i)}}[m]$, where c(i) denotes the total number of streams corresponding to codeword i and $1 \leq c(i) \leq S$. In other words, an i-th codeword (equivalently codeword i, or codeword associated with index i) may be associated with a set of stream indices $S_i = \{i_1, i_2, \ldots, i_{c(i)}\}$, such that the stream vector $x_i(m)$ coming from the i-th codeword is expressed as:

$$x_i(m) = [x_{i_1}[m], \ldots, x_{i_{c(i)}}[m]]^T.$$

Similarly, the channels corresponding to the i-th codeword may be expressed using stream indices from the stream set $S_i$ as follows:

$$H_i(m) = [h_{i_1}[m], \ldots, h_{i_{c(i)}}[m]]^T.$$

In some embodiments, transmitter 110 and receiver 180 may employ a retransmission protocol that allows transmitter 110 to transmit information bits 101, 103, or 105 to receiver 180 multiple times. For example, transmitter 110 and receiver 180 may employ an automatic repeat request (ARQ) or hybrid automatic repeat request (HARQ) scheme. When an ARQ or HARQ scheme is used, receiver 180 may include back channel transmitter 115. Back channel transmitter 115 may be operable to send acknowledgement signals back to transmitter 110 through backchannel 107. An affirmative acknowledgement signal may be sent by back channel transmitter 115 in response to a successful transmission, while a negative or no acknowledgement signal may be sent if a transmission is not successful. A successful transmission is one where the received signal y is reconstructed and accepted by receiver 180. Receiver 180 may accept reconstructed information when, for example, receiver 180 does not detect any errors (e.g., from a cyclic redundancy check) in the reconstructed information. The reconstruction process may include decoding, diversity combining, signal processing, another technique, or a combination thereof.

While the present disclosure is described primarily with respect to ARQ and HARQ retransmission protocols, other retransmission protocols may also be used. For example, a transmission system may employ a repetition coding and transmission protocol, where a fixed number of retransmissions is sent for every data packet that is transmitted irrespective of the number of transmissions needed by the receiver. In this case, because retransmission requests may not be needed to implement the retransmission protocol, transmitter 115 may not be needed.

A transmission may be defined as a Transmission Time Interval (TTI) and a transmission time t may be defined as the index of a particular TTI. For example, in the Long Term Evolution (LTE) protocol, a subframe may correspond to a TTI for the Physical Downlink Shared Channel (PDSCH), and transmission time t may correspond to an identifier of the subframe (e.g., t=Subframe_ID). From a plurality of K codewords transmitted at a transmission time t, each codeword i of the K codewords may have been transmitted by transmitter 110 for a different number of transmission attempts $k_i$. For example, a transmission time t may correspond to a second transmission attempt of codeword 1 ($k_1=2$) and a first transmission attempt of codeword 2 ($k_2=1$). The transmission time t corresponding to the $k_i$-th transmission attempt of codeword i may be expressed using function $t_i(\cdot)$ as follows:

$$t = t_i(k_i).$$

In the following description, the transmission time t may sometimes be omitted to simplify the notation.

The system model of EQ. 3 may be extended to account for the retransmission capabilities of MIMO system 100 as follows:

$$y(m) = H(m)x(m) + z(m) = \sum_{i=1}^{c} H_i^{(k_i)}(m) x_i^{(k_i)}(m) + z(m),$$

where y is the R×1 received vector representing the signals received by the R receive antennas of receiver 180 at a receiving time corresponding to transmission time t, and z is an R×1 signal vector representing additive noise with noise variance $\sigma^{(t)^2}$ associated with transmission time t. Channel H is a T×R matrix representing the effect of channel 160 on transmit vector x. Channel H may be expressed using channel components $H_i^{(k_i)}$ (i=1, \ldots, K), where each channel component $H_i^{(k_i)}$ represents the portion of channel H corresponding to codeword i under its $k_i$-th transmission attempt at time t. Channel H may also be expressed using channel components $h_s(m;t)$ (s=1, \ldots, S), where each channel component $h_s(m;t)$ represents the portion of channel H corresponding to stream s transmitted at transmission time t. Both representations of channel H are shown in the following:

$$H(m;t) = H(m) = [H_1^{(k_1)}(m) \ldots H_C^{(k_C)}(m)] = [h_1(m;t) \ldots h_S(m;t)].$$

Vector x is a T×1 vector containing the transmit values transmitted by the T transmit antennas of transmitter 110 at transmission time t as follows:

$$x(m;t) = x(m) = [x_1^{(k_1)T}(m) \ldots x_C^{(k_C)T}(m)]^T.$$

At the transmission time t, each transmit value $x_i^{(k_i)}$ may correspond to a transmission attempt $k_i$. In the following description and for purposes of illustration, x(m;t) may be simply denoted as x(m) or x.

The same transmit values may be transmitted during multiple transmission attempts of a same codeword. Alternatively, different transmit values may be transmitted. For example, a transmit value $x_i^{(k)}(m)$ of a codeword i transmitted during transmission attempt k may be different from a transmit value $x_i^{(j)}(n)$ of the same codeword i transmitted during another transmission attempt j. This is the case, for example, when incremental redundancy (IR HARQ) is used in successive transmissions.

One technique for improving the performance of a MIMO system, e.g., the system 100 of FIG. 1, is to use interference cancellation. According to this technique, a codeword containing a smaller amount of signal corruption due to noise, interference, or other sources may be decoded first, before other codewords associated with a larger amount of signal corruption. Effects of the decoded codeword on other codewords may be subtracted from a received signal vector, e.g., received vector y of FIG. 1, to eliminate the interference of the decoded codeword on the other codewords.

Interference cancellation techniques can be implemented in a number of ways. For example, interference cancellation can be implemented such that all codewords are decoded in parallel, such that one codeword is serially decoded at each stage, or such that any arbitrary number of codewords is decoded simultaneously at each stage. The systems and methods of this disclosure, however, may apply to any of these interference cancellation techniques. For example, any interference cancellation implementation (e.g., serial or parallel) may use the stopping criteria or early termination metrics discussed herein.

For the remainder of the disclosure, it is assumed that each of the K codewords is mapped to a single stream, such that the channel model may be written as $$y = Hx + z, \qquad \text{EQ. (4)}$$

where H denotes the R×K effective channel matrix, x denotes the K×1-sized transmitted signal vector, and z denotes an R×1 noise vector. It should be understood, however, that the disclosed systems and methods may be extended to similar channel models without departing from the scope of the present disclosure.

Figure 2:
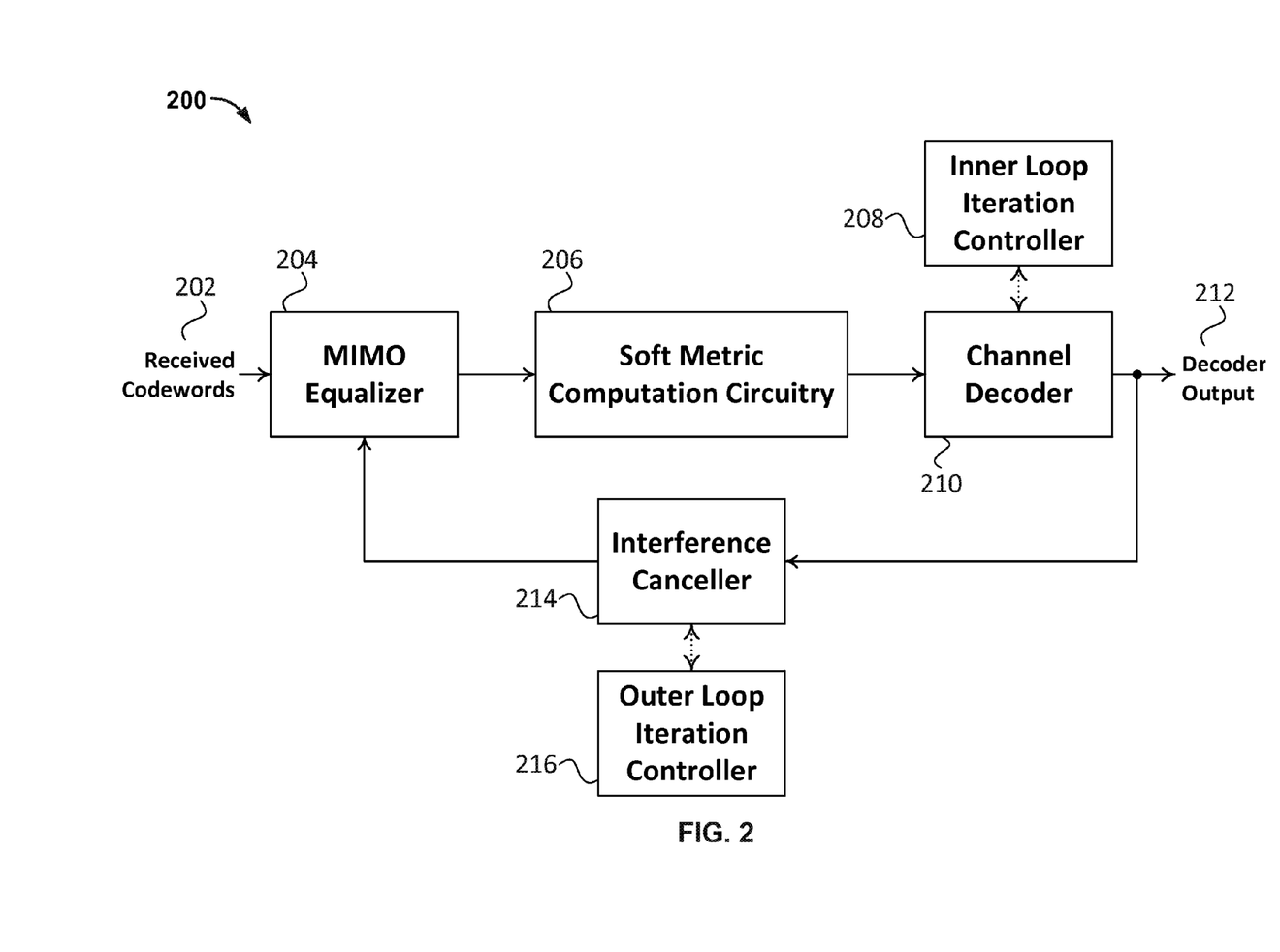
FIG. 2 is a high-level block diagram of an interference cancellation system, in accordance with some embodiments of the present disclosure.

FIG. 2 is a high-level block diagram of an interference cancellation system 200, in accordance with some embodiments of the present disclosure. Interference cancellation system 200 may process a plurality of received codewords (e.g., the K codewords discussed in relation to FIG. 1) to obtain a decoder output 212 after one or more iterations. Interference cancellation system 200 may include MIMO equalizer 204, soft metric computation circuitry 206, channel decoder 210, and interference canceller 214. Channel decoder 210 may be coupled to inner loop iteration controller 208, and interference canceller 214 may be coupled to outer loop iteration controller 216. Inner loop iteration controller 208 and outer loop iteration controller 216 may determine how many iterations are carried out by channel decoder 210 and interference canceller 214, respectively.

In some aspects, a plurality of codewords may be received by MIMO equalizer 204. MIMO equalizer 204 may process the received codewords in order to equalize the plurality of codewords such that they can be processed more efficiently by channel decoder 210. For example, MIMO equalizer 204 may be matched to a precoding matrix used by transmitter 110 and may reduce impairments caused by the transmission through MIMO channel 160. In some implementations, the processing performed by MIMO equalizer 204 may be linear. For example, signals received from each receive antenna may be processed with a precoding matrix that reverses precoding performed at the transmitter. The processing performed by MIMO equalizer 204 may further take into account statistics of the noise z. For example, MIMO equalizer 204 may use algorithms such as zero-forcing or minimum mean square error (MMSE) equalization. The output of MIMO equalizer 204 may be a sequence of codewords or transmission streams.

The sequence of codewords processed by MIMO equalizer 204 may be used by soft metric computation circuitry 206 to compute log-likelihood ratio (LLR) values for each bit in each of the K received codewords. In some implementations, the LLR values may be defined by $$LLR_k(\tau, l) = \log \frac{P(b_{\tau,l} = 1)}{P(b_{\tau,l} = 0)},$$

where k∈{1, . . . ,K} denotes a codeword index, l∈{1, . . . ,N$_k$} indexes the bits in the kth codeword, and T enumerates iterations of the iterative cancellation scheme. In other words, the expression $LLR_k(\tau,l)$ represents the likelihood that the lth bit of the kth codeword, after T iterations, is a logical one rather than a logical zero. Accordingly, a high LLR value indicates that the corresponding bit is likely a logical one, whereas a small LLR value indicates that the bit is likely a logical zero. An LLR value close to zero indicates that there is a large degree of uncertainty in determining the value of the bit. For example, an LLR value of zero denotes that it is equally likely that the corresponding bit is a logical one or a logical zero. In some aspects, LLR values may also be referred to as extrinsic information.

When transmitter 110 uses a retransmission protocol, such as ARQ or HARQ, soft metric computation circuitry 206 may combine LLR values of a current transmission with the LLR values of previous transmissions of the same codeword. The previously computed LLR values may be stored for each of the previous transmission attempts. Alternatively or additionally, soft metric computation circuitry 206 may maintain a cumulative LLR value that represents a combined LLR of all previous transmissions. In this case, when another retransmission is received, soft metric computation circuitry 206 may simply update the cumulative LLR value in accordance with the newly received retransmission.

Channel decoder 210 may process the output of soft metric computation circuitry 206 to decode the K received codewords. Channel decoder may use various decoding algorithms such as LDPC decoding schemes, Turbo decoding schemes, or any other suitable type of decoding scheme. In some aspects, channel decoder 210 may use an iterative decoding process, to decode the bits of each codeword in multiple iterations. For example, if channel decoder 210 uses an LDPC decoding scheme, channel decoder 210 may use a min-sum or bit-flipping algorithm that processes codewords in multiple iterations. As will be explained in more detail below, channel decoder 210 may be coupled to inner loop iteration controller 208. At a suitable time during each iteration (e.g., at the beginning or at the end of an iteration), channel decoder 210 may provide a decoder metric to inner loop iteration controller 208. Inner loop iteration controller 208 may process the decoder metric and, when appropriate, compare it with decoding metrics received during previous iterations. For example, in some implementations, inner loop iteration controller 208 may determine whether aggregated decoding metrics show a sufficient degree of improvement from one iteration to the next. If the aggregate decoding metric saturates, inner loop iteration controller 208 may determine that channel decoder 210 should not perform any more iterations. On the other hand, if the aggregate decoding metric shows a large degree of improvement from one iteration to the next, inner loop iteration controller 208 may cause channel decoder 210 to perform further iterations. The determination of whether to perform further iterations may take into account a desired level of accuracy that should be achieved by channel decoder (e.g., a certain bit, symbol, or block error rate). Inner loop iteration controller 208 may further take into account complexity considerations in order to determine whether any additional processing is desirable from a performance versus complexity standpoint.

Once channel decoder 210 completes its processing, the decoded codewords, e.g., still defined in terms of LLR values, may be processed by interference canceller 214. Interference canceller 214 may perform various types of interference cancellation. In a first embodiment, interference canceller 214 may perform parallel interference cancellation by removing, for each codeword, interference from many or all other codewords. In some aspects, only a portion of the interference may be removed using this process, because the other codewords have not been fully decoded. However, the use of LLR values, or "soft" information metrics, allows the partial removal of interference from a codeword, even if the remaining interfering codewords have not been fully decoded.

In a second embodiment, interference canceller 214 may use successive interference cancellation by ordering the codewords in decreasing order of reliability (e.g., based on some aggregate metric as discussed below) and subtracting the interference from the received signal in this order. The interference resulting from the codeword to be subtracted may be removed based on soft information (e.g., the LLR values of the codeword to be subtracted) or based on hard information (e.g., hard decisions, such as logical one or logical zero, derived from the LLR values).

In some implementations, interference canceller 214 may be coupled to outer loop iteration controller 216. Outer loop iteration controller 216 may perform similar functions as inner loop iteration controller 208. For example, outer loop iteration controller 216 may receive decoding metrics, possibly in aggregate form, from interference canceller 214. Outer loop iteration controller may compare the received metrics with metrics obtained in previous iterations, or with a predefined target threshold for decoding accuracy/reliability. Outer loop iteration controller 216 may further determine whether a sufficient degree of improvement, in terms of the decoding metric, is achieved from one iteration to the next. If the improvement is small, outer loop iteration controller 216 may determine that further iterations are not warranted. Conversely, if a large degree of improvement occurs from one iteration to the next, outer loop iteration controller 216 may determine that further iterations should be performed.

If outer loop iteration controller 216 determines that at least one additional iteration should be performed, the output of interference canceller 214 may be reprocessed by MIMO equalizer 204. For example, the received signal, subject to partial removal of interference from the one or more cancelled codewords, may be processed by MIMO equalizer 204 in a similar manner as during the first iteration. Conversely, if outer loop iteration controller 216 determines that further iterations are not needed or not warranted, then the decoding process may be complete after reprocessing the output of interference canceller 214 once more by MIMO equalizer 204, soft metric computation circuitry 206, and channel decoder 210.

Figure 3:
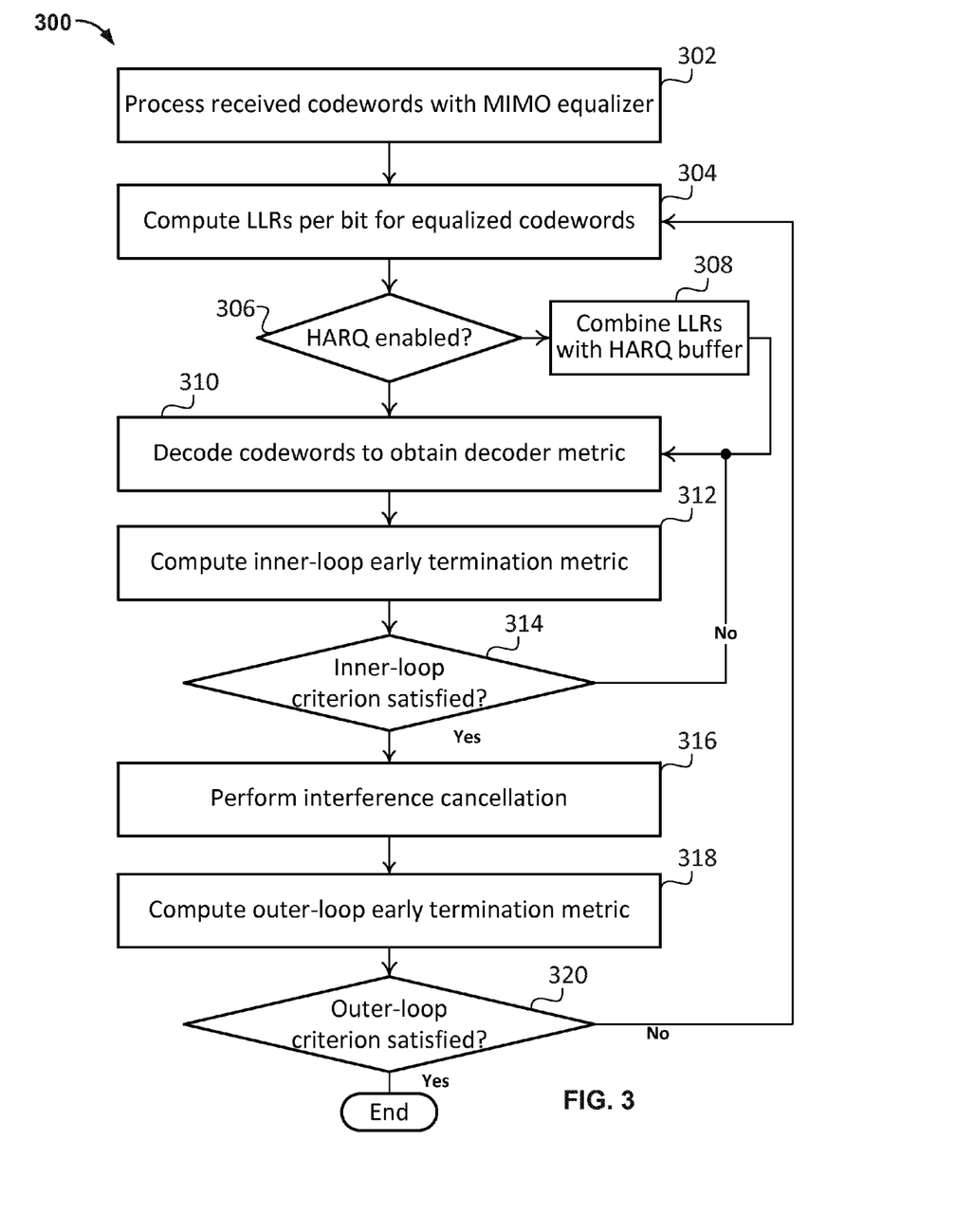
FIG. 3 is a flow diagram illustrating an interference cancellation process, in accordance with some embodiments of the present disclosure.

FIG. 3 is a flow diagram illustrating an interference cancellation process 300, in accordance with some embodiments of the present disclosure. At step 302, process 300 may process received codewords with a MIMO equalizer, such as MIMO equalizer 204 of FIG. 2. Process 300 may process the received signal with a MIMO equalizer in order to bring it into a form that can be more easily processed by a channel decoder, such as channel decoder 210. For example, the MIMO equalizer may reduce impairments caused by MIMO channel 160. The processing performed by the MIMO equalizer may take into account a precoding matrix used at the transmitter side, such as precoder matrix 150. In some aspects, the precoding may be known at the receiver because it may be fixed through standardization or specification by an implementer. Alternatively, the precoding performed at the transmitter side may be estimated by the receiver. In some embodiments, the processing performed by the MIMO equalizer may further take into account statistics of the noise z.

Process 300, at 304, may compute LLR values per bit for each of the equalized codewords. In some implementations, the LLR values may be computed by soft metric computation circuitry, such as soft metric computation circuitry 206. As is discussed in relation to FIG. 2, the LLR value for a specific bit in a codeword during a given iteration represents the likelihood that this bit represents a logical one rather than a logical zero. Accordingly, a positive LLR value with large magnitude may serve as an indication that the corresponding bit represents a logical one. Similarly, a negative LLR value with large magnitude may serve as an indication that the corresponding bit represents a logical zero. An LLR value with small magnitude (e.g., close to zero) may represent that there is a comparably larger degree of uncertainty about whether the bit represents a logical zero or a logical one.

At 306, process 300 may determine whether any of the received codewords has previously been transmitted in whole or in part and is now subject to a retransmission, e.g., using an ARQ or HARQ protocol. If process 300 determines that one or more codewords are subject to such a retransmission, process 300 may combine the LLR values that are associated with the present retransmission with LLR values that have previously been computed for the initial transmissions (or early retransmissions) of the one or more codewords. By combining the LLR values across previous transmissions, decoding reliability may be improved because each of the previous transmissions provided information about the bit values of the one or more codewords. In some implementations, information about the previous transmissions may be stored in an HARQ buffer that contains the combined LLR values of all previous transmissions.

If one or more of the received codewords are subject to an HARQ scheme, process 300 may, at 308, combine the LLR values of the one or more codewords with their respective combined LLR values from previous transmissions. The combination may be performed using various schemes such as Chase combining or incremental redundancy.

At 310, process 300 may attempt to decode the plurality of codewords using a channel decoder, such as channel decoder 210. The channel decoder may employ various algorithms to perform the decoding, such as LDPC decoding schemes, Turbo decoding schemes, or any other suitable type of decoding scheme. In some embodiments, the channel decoder may utilize an iterative decoding algorithm that processes each of the received codewords for a number of decoding iterations. After each iteration, the channel decoder may obtain an updated decoder metric that represents the current state of the decoder process.

In some embodiments, process 300 may, at 314, determine from a current decoder metric whether additional iterations of the channel decoder should be performed or if the channel decoder should stop the iterative decoding process. In some aspects, this determination may be made based on the current LLR values associated with the plurality of codewords. For example, in some aspects, process 300 may determine to stop the iterative decoding process if $$X_{STOP} = f(LLR_k(\tau,l), \tau=1, \ldots, \tau, l=1, \ldots, N, k=1, \ldots, K) \quad \text{EQ. (5)}$$

is equal to logical one, or more generally, if it assumes any predetermined value. According to the above equation, function $f(\bullet)$ takes as its input the entire set of LLR values across the plurality of codewords, including the LLR values obtained during previous iterations.

In some embodiments, the function $f(\bullet)$ may be simplified such that, instead of the LLR values for all bits and all codewords, only aggregate metrics are considered. A benefit of this approach may be the more compact form of function $f(\bullet)$. Instead of requiring a large number of inputs (e.g., the LLR values for all bits across all codewords and previous transmissions), an aggregate decoding metric may be defined (e.g., for each codeword). This aggregate metric may be denoted by $$\beta_k(\tau) = g(LLR_k(\tau,l), l=1, \ldots, N_k)$$

for each previous transmission $\tau \in \{1, \ldots, t\}$ and each codeword $k \in \{1, \ldots, K\}$ in the plurality of codewords. The function $g(\bullet)$ may be a mapping from the set of bitwise LLRs value to the metric $\beta$. For example, $\beta$ may be defined as the average LLR value of a given codeword and transmission attempt, averaged over the encoded bits, e.g., $$g(LLR_k(\tau, l)) = \frac{1}{N_k} \sum_{l=1}^{N_k} LLR_k(\tau, l)$$

where $\tau \in \{1, \ldots, t\}$ and $k \in \{1, \ldots, K\}$. It should be understood that the above expression for $g(\cdot)$ is exemplary. In general, the function $g(\cdot)$ may be an aggregate metric that is based on mutual information associated with the encoded bits, an LLR magnitude, or any other suitable metric.

In some aspects, the function $f(\cdot)$ may be any suitable function that maps the aggregate metrics $\beta_k(\tau)$ to a binary value that indicates whether further iterations should be performed. In some implementations, the function $f(\cdot)$ may take absolute values from the current and one or more previous iterations into account, as shown in Eq. (5). In other implementations, the input to function $f$ may be a differential of the aggregate metric that represents the improvement (or possibly the degradation) that has occurred from one iteration to the next. Mathematically, this may be expressed as $$x_{STOP} = f(\beta_k(\tau), \Delta\beta_k(\tau), \tau=1, \ldots, t, k=1, \ldots, K),$$

where $\Delta\beta_k(\tau) \triangleq \beta_k(\tau) - \beta_k(\tau-1)$.

In some embodiments, the function $f$ may evaluate each codeword separately and may determine, per codeword, whether a stopping criterion is satisfied. The iterative decoding process may then be stopped if the stopping criterion is satisfied for more than a predetermined number of codewords (e.g., for at least one codeword). In other embodiments, it may be necessary that all codewords satisfy the stopping criterion for the iterative decoding process to be stopped.

In the following paragraphs, two exemplary embodiments are described for which specific definitions of the functions $f$ and $g$ are given. It should be understood, however, that these exemplary embodiments are merely described for illustration, and that other types of functions may be considered without departing from the scope of the present disclosure. Further, the stopping criteria disclosed herein may be combined with other stopping criteria, such as terminating decoding after a predetermined number of iteration, or terminating decoding once all or a subset of the plurality of codewords have been decoded successfully (e.g., based on a cyclic redundancy check).

In a first embodiment, the function $g$ may be based on mutual information metrics. In some aspects, mutual information may be viewed as a measure of the mutual dependence of two random variables. For example, if two random variables are statistically independent, then knowledge of one of the random variables does not provide any information about the other random variable. The mutual information of these two variables is therefore zero. In contrast, if the two variables can be derived deterministically from one another (e.g., when the first random variable is a deterministic function of the second random variable), then the mutual information is large because all information conveyed by one of the random variables is shared with the other random variable. For determining an aggregate metric in connection with a stopping criterion, it may be desirable to maximize the mutual information between a received signal vector and the encoded bits or symbols of a given codeword. In some embodiments, using mutual information as a posteriori information may be more reliable than other probability metrics.

In some aspects, the aggregate metric $\beta_k(\tau)$ may be defined as $$\beta_k(\tau) = MI_k(\tau) = \frac{1}{N_k} \sum_{l=1}^{N_k} (1 + p_k(l))\log_2 p_k(l) + (1 - p_k(l))\log_2(1 - p_k(l)),$$

where $$p_k(l) = \frac{1}{1 + \exp|LLR_k(\tau, l)|}. \qquad \text{EQ. (6)}$$

In each iteration, the metric $MI_k(\tau)$ may be computed based on the above formulas. In some implementations, the computation of metric $MI_k(\tau)$ may based in part on lookup tables that associate LLR values $LLR_k(\tau,l)$ with $p_k(l)$. Computational complexity may be reduced in this way, because the exponential function in Eq. (6) may not need to be evaluated explicitly. Instead, a simple mapping from LLR values (or LLR intervals) to $p_k(l)$ values (or $p_k(l)$ intervals) may be performed.

Upon obtaining the metrics $MI_k(\tau)$ for all K codewords in the $\tau$th iteration, the stopping criterion may be expressed as $$x_{STOP} = f(MI_k(\tau), \tau=1, \ldots, t, k=1, \ldots K).$$

In other words, the aggregate mutual information metrics $MI_k(\tau)$ in the $\tau$th iteration serve as separate inputs to the function $f$.

In some implementations, the function $f$ may determine whether a stopping criterion is met based on comparing the value of the aggregate mutual information in the previous iteration with the aggregate mutual information in the current iteration. Mathematically, this may be expressed as $$x_{STOP} = f(\Delta MI_k(t), MI_k(t-1), k=1, \ldots, K),$$

where $\Delta MI_k(t) \triangleq MI_k(t) - MI_k(t-1)$. In some implementations, the input $MI_k(t-1)$ may be used to normalize the gain that has been achieved between iterations $t-1$ and $t$. In other implementations, such normalization may not be performed and the input $MI_k(t-1)$ may be omitted.

In some aspects, a predefined or dynamic threshold may be used to determine whether the incremental gain that has been achieved from one iteration to the next is large enough to justify performing additional iterations. For example, the function $f$ may be specified as $$x_{STOP} = f(\Delta MI_k(t), MI_k(t-1), k=1, \ldots, K) = \begin{cases} 1, & \text{if } \frac{\Delta MI_k(t)}{MI_k(t-1)} \leq \gamma_k \forall k \\ 0, & \text{otherwise} \end{cases},$$

where $\gamma_k$ denotes a predefined or dynamic threshold for the incremental gain in the aggregate mutual information metric for codeword k.

In some implementations, the function $f$ may be defined such that the stopping criterion is satisfied if a subset $\Omega \subseteq \{1, \ldots, K\}$ of the K codewords satisfies the incremental condition of the previous equation:

$$x_{STOP} = f(\Delta MI_k(t), MI_k(t-1), k=1, \ldots, K) =$$
$$\begin{cases} 1, & \text{if } \frac{\Delta MI_k(t)}{MI_k(t-1)} \leq \gamma_k \forall k \in \Omega \subseteq \{1, \ldots, K\} \\ 0, & \text{otherwise} \end{cases}.$$

In yet other embodiments, the determination of whether the stopping criterion is satisfied may be based on the maximum incremental gain of the aggregate mutual information across the K codewords. Mathematically, this may be expressed as $$x_{STOP} = f(\Delta MI_k(t), MI_k(t-1), k=1, \ldots, K) =$$
$$\begin{cases} 1, & \text{if } \max_{k \in \{1, \ldots, K\}} \frac{\Delta MI_k(t)}{MI_k(t-1)} \leq \gamma \\ 0, & \text{otherwise} \end{cases}.$$

In some implementations, determining whether the stopping criterion is met may be based on the absolute value of the aggregate mutual operation in the present iteration, i.e., $$x_{STOP} = f(MI_k(t), k=1, \ldots, K).$$

For example, $x_{STOP}$ may be given by $$x_{STOP} = f(MI_k(t), k=1, \ldots, K) = \begin{cases} 1, & \text{if } MI_k(t) \geq \gamma_k, \forall k \\ 0, & \text{otherwise} \end{cases},$$

where $\gamma_k$ denotes a predefined or dynamic threshold on the absolute aggregate mutual information for codeword k.

In some implementations, the function $f$ may be defined in a way such that if a subset $\Omega \subseteq \{1, \ldots, K\}$ of the K codewords satisfies the incremental condition, then the stopping criterion is satisfied. Mathematically, this may be expressed as $$x_{STOP} =$$
$$f(MI_k(t), k=1, \ldots, K) = \begin{cases} 1, & \text{if } MI_k(t) \geq \gamma_k, \forall k \in \Omega \subseteq \{1, \ldots, K\} \\ 0, & \text{otherwise} \end{cases}.$$

In some implementations, determining whether the stopping criterion is satisfied may be based on the minimum mutual information across the K codewords, i.e., $$x_{STOP} = f(MI_k(t), k=1, \ldots, K) = \begin{cases} 1, & \text{if } \min_{k \in \{1, \ldots, K\}} MI_k(t) \geq \gamma \\ 0, & \text{otherwise} \end{cases}.$$

In a second embodiment, function g may represent an average LLR magnitude across the codeword, i.e., $$\beta_k(\tau) = A_k(\tau) = \frac{1}{N_k} \sum_{l=1}^{N_k} |LLR_k(\tau, l)|.$$

The utilization of the above metric may be motivated by two observations. First, the magnitude of the LLR value serves as an indication of the likelihood that an information bit is either a logical zero or a logical one. A large magnitude of the LLR indicates that the information bit is likely going to be a logical one (if the LLR is positive) or that the information bit is likely to correspond to a logical zero (if the LLR is negative). If the magnitude of the LLR is small, then the information about the information bit is less reliable. For making the determination of whether to stop an iterative decoding process, the reliability with which information bits can be decoded is the information of interest (but not whether a certain bit corresponds to a logical zero or a logical one). Accordingly, the magnitude of the LLR reflects important information for determining the codeword order. Second, computing the average LLR magnitude over the information bits in the codeword is motivated by the fact that a single metric per codeword is convenient for determining the decoding order. The average LLR magnitude reflects the average reliability associated with the decoding of the information bits in a certain codeword. However, other operations may be considered such as taking the median of the LLR magnitudes in a codeword.

After obtaining the average LLR magnitude as an aggregate metric, the stopping criterion may be expressed as average LLR magnitude as an aggregate metric, the stopping criterion may be expressed as $$x_{STOP} = f(A_k(\tau), \tau=1, \ldots, t, k=1, \ldots, K).$$

In some embodiments, determining whether the stopping criterion is satisfied may be based on the incremental value of the LLR magnitude in the last iteration, i.e., $$x_{STOP} = f(\Delta A_k(t), A_k(t-1), k=1, \ldots, K),$$

where $\Delta A_k(t) \triangleq A_k(t) - A_k(t-1)$. In this way, the exemplary stopping criterion may be given by $$x_{STOP} = f(\Delta A_k(t), A_k(t-1), k=1, \ldots, K) = \qquad \text{EQ. (7)}$$
$$\begin{cases} 1, & \text{if } \frac{\Delta A_k(t)}{A_k(t-1)} \leq \gamma_k, \forall k \\ 0, & \text{otherwise} \end{cases}.$$

where $\gamma_k$ denotes a predefined or dynamic threshold applied to the normalized incremental gain in average LLR magnitude.

In some implementations, the function $f$ may be defined in a way such that if only a subset $\Omega \subseteq \{1, \ldots, K\}$ of the K codewords satisfies the incremental condition in (6), the stopping criterion is still satisfied, e.g., $$x_{STOP} = f(\Delta A_k(t), A_k(t-1), k=1, \ldots, K) =$$
$$\begin{cases} 1, & \text{if } \frac{\Delta A_k(t)}{A_k(t-1)} \leq \gamma_k, \forall k \in \Omega \subseteq \{1, \ldots, K\} \\ 0, & \text{otherwise} \end{cases}.$$

Alternatively, the stopping criterion may also be defined based on the maximum increment of the LLR magnitude. Mathematically, this may be expressed as $$x_{STOP} =$$
$$f(\Delta A_k(t), A_k(t-1), k=1, \ldots, K) = \begin{cases} 1, & \text{if } \max_{k \in \{1, \ldots, K\}} \frac{\Delta A_k(t)}{A_k(t-1)} \leq \gamma \\ 0, & \text{otherwise} \end{cases}.$$

In some implementations, the function $f$ may be based on the absolute value of the LLR magnitude in the last iteration, i.e., $$x_{STOP} = f(A_k(t), k=1, \ldots, K).$$

Determining whether the stopping criterion is met may then be based on $$x_{STOP} = f(A_k(t), k = 1, \ldots, K) = \begin{cases} 1, & \text{if } A_k(t) \geq \gamma_k, \forall k \\ 0, & \text{otherwise} \end{cases}, \quad \text{EQ. (8)}$$

where $\gamma_k$ denotes the predefined or dynamic threshold of the LLR magnitude. Alternatively, the function $f$ may also be defined in a way such that if the condition in Eq. (8) is satisfied for only a subset $\Omega \subseteq \{1, \ldots, K\}$ of the K codewords, the stopping criterion is still met, e.g., $$x_{STOP} = f(A_k(t), k = 1, \ldots, K) = \begin{cases} 1, & \text{if } A_k(t) \geq \gamma_k, \forall k \in \Omega \subseteq \{1, \ldots, K\} \\ 0, & \text{otherwise} \end{cases}.$$

Alternatively, determining whether the stopping criterion is met may be based on the minimum LLR magnitude $$x_{STOP} = f(A_k(t), k = 1, \ldots, K) = \begin{cases} 1, & \text{if } \min_{k \in \{1, \ldots, K\}} A_k(t) \geq \gamma \\ 0, & \text{otherwise} \end{cases}.$$

In some embodiments, if process 300 determines, at 314, that the inner-loop stopping criterion is satisfied, process 300 may proceed with another iteration of the iterative decoding process at 310. Alternatively, if process 300 determines that the inner loop stopping criterion is satisfied, process 300 may proceed to perform interference cancellation.

Process 300, at 316, may perform interference cancellation based on the decoder output of the latest iterative decoding iteration. The interference cancellation may be carried out by an interference canceller, such as interference canceller 214 discussed in relation to FIG. 2. Interference among the plurality of codewords may be cancelled using various techniques, such as parallel or successive (serial) interference cancellation techniques.

Once interference has been cancelled from the plurality of codewords, process 300 may determine, at 318, whether an additional outer loop iteration should be performed. In order to make this determination, process 300 may, at 318, compute an outer loop early termination metric. The outer loop early termination metric may be determined based on similar stopping criteria as discussed in relation to the inner loop early termination metric computed by process 300 at 312. In some aspects, the outer loop early termination metric may be computed by outer loop iteration controller 216 of FIG. 2. The outer loop early termination metric may be computed based on the latest decoder output (e.g., the extrinsic information obtained by the channel decoder in the latest iteration). In contrast, the inner loop early termination metric may be computed based on the extrinsic information associated with each iteration of the channel decoder's decoding process.

In some embodiments, the predefined or dynamic thresholds associated with the inner loop early termination criteria may be adjusted based on the outer loop early termination metrics. Further, it should be understood that inner loop stopping criteria and outer loop stopping criteria may be enforced independently of one another, without departing from the scope of the present disclosure. For example, in some implementations, only outer loop early termination may be supported; in others, only inner loop early termination may be supported. In some aspects, only inner loop early termination may be used when successive interference cancellation is employed.

Figure 4:
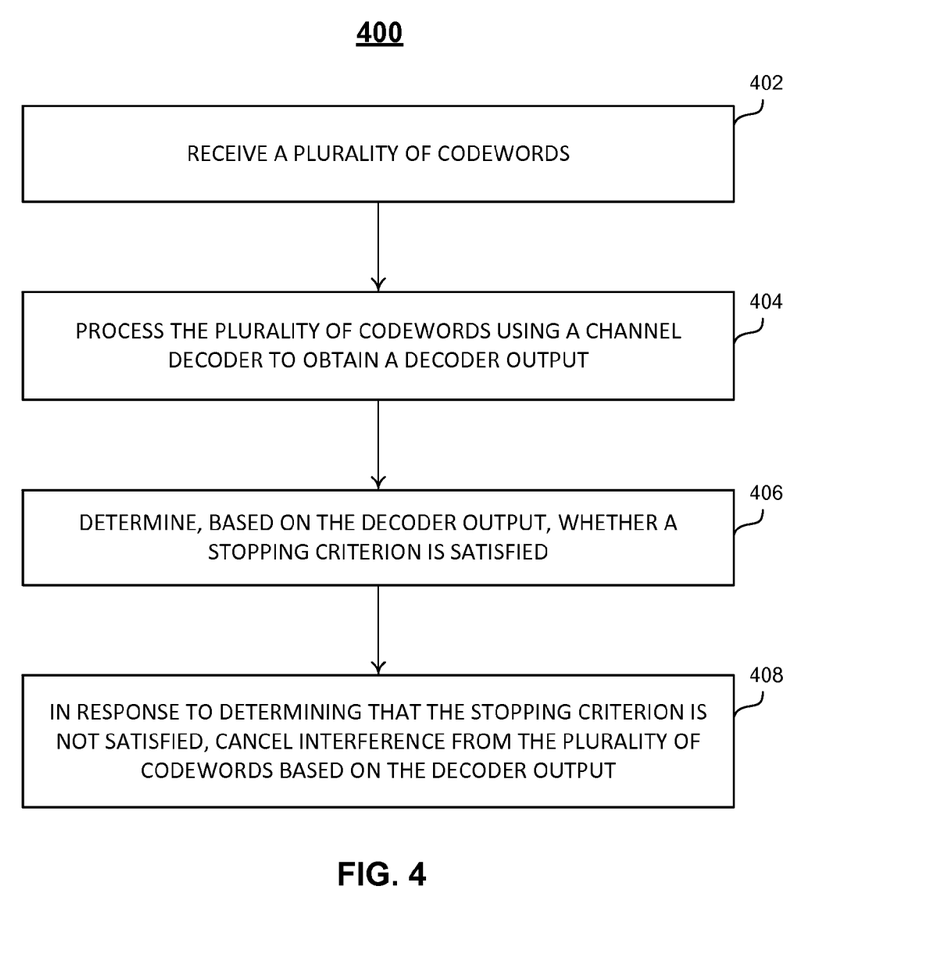
FIG. 4 is a high-level flow diagram of a process for performing iterative interference cancellation, in accordance with some embodiments of the present disclosure.

FIG. 4 is a high-level flow diagram of a process 400 for performing iterative interference cancellation, in accordance with some embodiments of the present disclosure. A receiver, such as receiver 180, may execute process 400 by receiving, at 402, a plurality of codewords. Process 400 may, at 404, process the plurality of codewords using a channel decoder to obtain a decoder output and, at 406, determine, based on the decoder output, whether a stopping criterion is satisfied. In response to determining that the stopping criterion is not satisfied, process 400 may cancel interference from the plurality of codewords based on the decoder output at 408.

At 402, process 400 may receive a plurality of codewords. In some embodiments, the plurality of codewords may be transmitted across MIMO channel 160 by transmitter 110. The plurality of received codewords may contain newly transmitted codewords (i.e., codewords that are being transmitted for the first time), retransmitted codewords (e.g., codewords that have been transmitted in whole or in part at a previous transmission time), or a combination of both. In some embodiments, the plurality of codewords may correspond to a single user (e.g., when spatial multiplexing is performed), whereas in other embodiments, the plurality of codewords may belong to two or more users. In the latter case, a first user may still perform interference cancellation for codewords that belong to a second user as long as the transmission format of the second user's codewords is available at the first user's receiver. In some embodiments, process 400 may also be applied to codewords across retransmissions associated with physical-layer or higher-layer retransmission schemes.

At 404, process 400 may process the plurality of codewords using a channel decoder to obtain a decoder output. In some embodiments, the channel decoder may process the plurality of codewords using any suitable type of decoding algorithm, such as an LDPC decoding algorithm, or a Turbo decoding algorithm. The channel decoder may perform the decoding in an iterative fashion, and decoder output may be obtained at some suitable time during each iteration (e.g., at the beginning of each iteration or at the end of each iteration). In some implementations, soft information metrics, such as LLR values, may be computed for the plurality of received codewords before the channel decoder commences the decoding process. As part of generating such soft information metrics, soft information metrics (e.g., LLR values) obtained from previous transmissions of the same codeword may be taken into account. For example, combined LLR values for each of the plurality of codewords may be maintained.

In some embodiments, the channel decoder may utilize an inner loop stopping criterion to determine how many channel decoder iterations to perform. For example, at the end of each iteration, the channel detector may evaluate whether a stopping criterion is satisfied. When the stopping criterion is satisfied, the channel detector may provide the decoding metrics of the latest iteration as output, whereas the channel detector may perform further decoding iterations when the stopping criterion is not satisfied.

At 406, process 400 may determine, based on the decoder output, whether a stopping criterion is satisfied. In some embodiments, the stopping criterion may correspond to an outer loop stopping criterion, as discussed in relation to FIGS. 2 and 3. In some aspects, the stopping criterion may be evaluated based on the decoder output provided by the channel decoder during the latest iteration, and any suitable stopping criterion may be used. In some implementations, the outer loop stopping criterion may be based on an improvement of decoding accuracy between iterations and therefore depend on the decoder output of the present iteration as well as previous iterations.

At 408, process 400 may cancel interference from the plurality of codewords based on the decoder output, in response to determining that the stopping criterion is not satisfied. Process 400 may utilize any suitable interference cancellation schemes, including parallel and successive interference cancellation. Process 400 may further perform the interference cancellation based on hard decisions (e.g., only when a codeword has been decoded correctly) or based on soft information metrics (e.g., LLR values). In some embodiments, the interference cancellation may result in a plurality of signals that contain residual interference from some of the plurality of codewords. The plurality of signals may be in a format that is suitable for processing by MIMO equalizer, in a second outer loop iteration of the decoding process. In some aspects, if the stopping criterion is satisfied at 408, interference cancellation is not performed. Instead, the latest decoder output is designed as the final decoding hypothesis.

Figure 5:
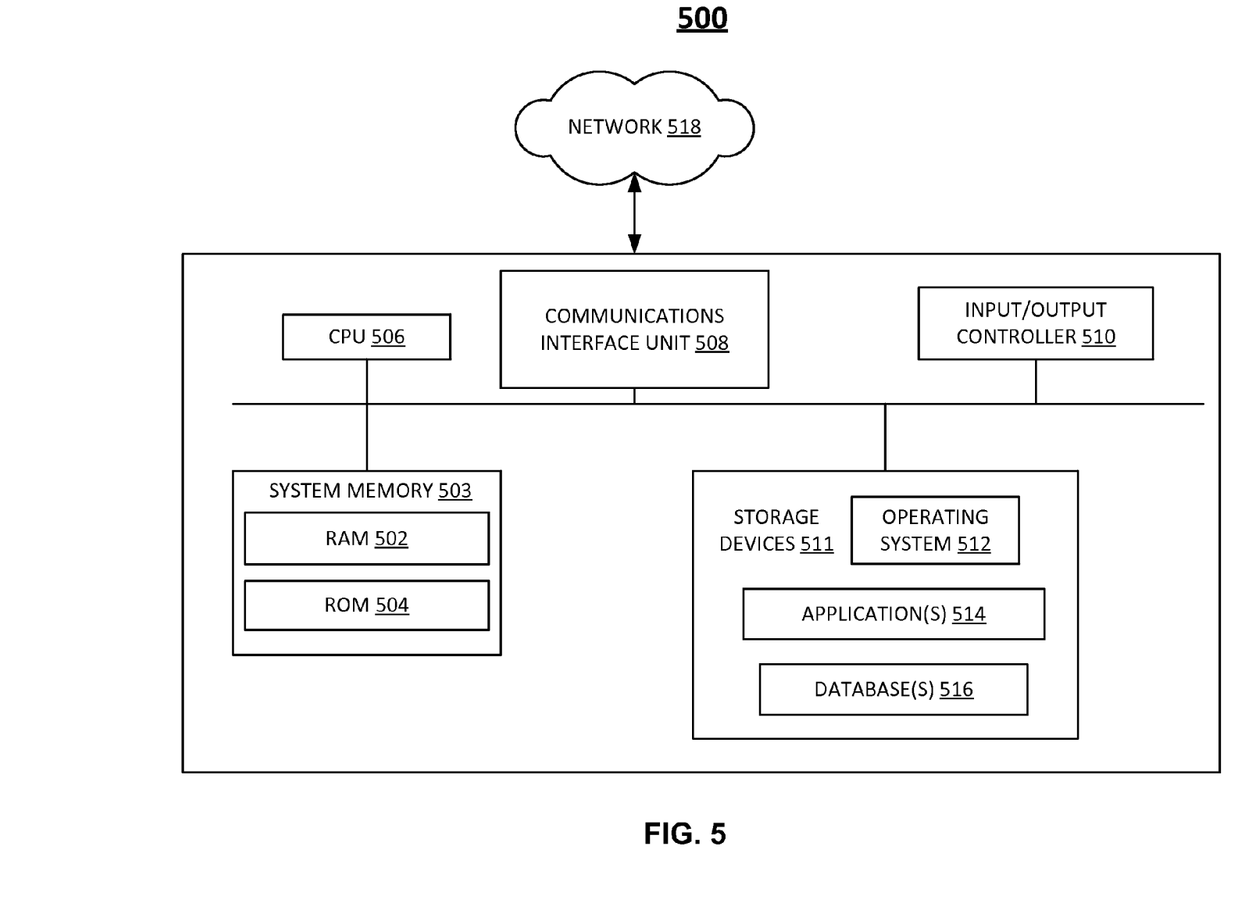
FIG. 5 shows a block diagram of a computing device, for performing any of the processes described herein, in accordance with some embodiment of the present disclosure.

FIG. 5 is a block diagram 500 of a computing device, such as any of the components of the system of FIG. 1, for performing any of the processes described herein, in accordance with an embodiment of the disclosure. Each of the components of these systems may be implemented on one or more computing devices 500. In certain aspects, a plurality of the components of these systems may be included within one computing device 500. In certain embodiments, a component and a storage device 511 may be implemented across several computing devices 500.

The computing device 500 comprises at least one communications interface unit 508, an input/output controller 510, system memory 503, and one or more data storage devices 511. The system memory 503 includes at least one random access memory (RAM 502) and at least one read-only memory (ROM 504). All of these elements are in communication with a central processing unit (CPU 506) to facilitate the operation of the computing device 500. The computing device 500 may be configured in many different ways. For example, the computing device 500 may be a conventional standalone computer or, alternatively, the functions of computing device 500 may be distributed across multiple computer systems and architectures. In FIG. 5, the computing device 500 is linked, via network 518 or local network, to other servers or systems.

The computing device 500 may be configured in a distributed architecture, wherein databases and processors are housed in separate units or locations. Some units perform primary processing functions and contain at a minimum a general controller or a processor and a system memory 503. In distributed architecture embodiments, each of these units may be attached via the communications interface unit 508 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to Ethernet, SAP, SAS™, ATP, BLUETOOTH™, GSM and TCP/IP.

The CPU 506 comprises a processor, such as one or more conventional microprocessors and one or more supplementary co-processors such as math co-processors for offloading workload from the CPU 506. The CPU 506 is in communication with the communications interface unit 508 and the input/output controller 510, through which the CPU 506 communicates with other devices such as other servers, user terminals, or devices. The communications interface unit 508 and the input/output controller 510 may include multiple communication channels for simultaneous communication with, for example, other processors, servers or client terminals.

The CPU 506 is also in communication with the data storage device 511. The data storage device 511 may comprise an appropriate combination of magnetic, optical or semiconductor memory, and may include, for example, RAM 502, ROM 504, a flash drive, an optical disc such as a compact disc or a hard disk or drive. The CPU 506 and the data storage device 511 each may be, for example, located entirely within a single computer or other computing device, or connected to each other by a communication medium, such as a USB port, serial port cable, a coaxial cable, an Ethernet cable, a telephone line, a radio frequency transceiver or other similar wireless or wired medium or combination of the foregoing. For example, the CPU 506 may be connected to the data storage device 511 via the communications interface unit 508. The CPU 506 may be configured to perform one or more particular processing functions.

The data storage device 511 may store, for example, (i) an operating system 512 for the computing device 500; (ii) one or more applications 514 (e.g., computer program code or a computer program product) adapted to direct the CPU 506 in accordance with the systems and methods described here, and particularly in accordance with the processes described in detail with regard to the CPU 506; or (iii) database(s) 516 adapted to store information that may be utilized to store information required by the program.

The operating system 512 and applications 514 may be stored, for example, in a compressed, an uncompiled and an encrypted format, and may include computer program code. The instructions of the program may be read into a main memory of the processor from a computer-readable medium other than the data storage device 511, such as from the ROM 504 or from the RAM 502. While execution of sequences of instructions in the program causes the CPU 506 to perform the process steps described herein, hard-wired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to determining a decoding order of a SIC receiver as described herein. The program also may include program elements such as an operating system 512, a database management system and "device drivers" that allow the processor to interface with computer peripheral devices (e.g., a video display, a keyboard, a computer mouse, etc.) via the input/output controller 510.

The term "computer-readable medium" as used herein refers to any non-transitory medium that provides or participates in providing instructions to the processor of the computing device 500 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer-readable media may be involved in carrying one or more sequences of one or more instructions to the CPU 506 (or any other processor of a device described herein) for execution. For example, the instructions may initially be borne on a magnetic disk of a remote computer (not shown). The remote computer may load the instructions into its dynamic memory and send the instructions over an Ethernet connection, cable line, or even telephone line using a modem. A communications device local to a computing device 500 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure and various modifications can be made without departing from the scope of the present disclosure. The above described embodiments of the present disclosure are presented for purposes of illustration and not of limitation, and the present disclosure is limited only by the claims which follow.

What is claimed is:

1. A method for performing iterative interference cancellation in an outer, interference cancellation, loop that includes an iterative channel decoder that processes a plurality of codewords in an inner, decoding, loop, the method comprising:
   receiving, using control circuitry, the plurality of codewords;
   processing the plurality of codewords using the iterative channel decoder to obtain a decoder output, wherein the processing of the iterative channel decoder is performed until the processed plurality of codewords satisfies an inner-loop stopping criterion;
   determining whether the decoder output satisfies an outer-loop stopping criterion; and
   in response to determining that the outer-loop stopping criterion is not satisfied, cancelling interference from the plurality of codewords based on the decoder output.

2. The method of claim 1, wherein cancelling the interference from the plurality of codewords is based on at least one of parallel interference cancellation or successive interference cancellation.

3. The method of claim 1, further comprising:
   determining, based on a first decoder output of a first iteration, whether the inner-loop stopping criterion is satisfied; and
   in response to determining that the inner-loop stopping criterion is not satisfied, processing the plurality of codewords using the iterative channel decoder in a second iteration to obtain a second decoder output.

4. The method of claim 1, wherein determining whether the decoder output satisfies the outer-loop stopping criterion comprises:
   computing a plurality of aggregate decoding metrics for the plurality of received codewords; and
   determining, based on the plurality of aggregate decoding metrics, whether the outer-loop stopping criterion is satisfied.

5. The method of claim 4, wherein the plurality of aggregate decoding metrics comprises at least one of mutual information metrics or log-likelihood ratio (LLR) magnitude values.

6. The method of claim 1, wherein the decoder output comprises a plurality of decoding metrics, and determining whether the decoder output satisfies the outer-loop stopping criterion comprises:
   comparing the plurality of decoding metrics to one or more thresholds; and
   determining that the outer-loop stopping criterion is satisfied if more than a predetermined number of the plurality of decoding metrics exceeds the one or more thresholds.

7. The method of claim 1, wherein the decoder output comprises a plurality of decoding metrics, and determining whether the decoder output satisfies the outer-loop stopping criterion comprises:
   identifying a decoding metric with maximum value among the plurality of decoding metrics; and
   determining that the outer-loop stopping criterion is satisfied if the decoding metric with maximum value exceeds a predefined threshold.

8. The method of claim 1, wherein the decoder output is a first decoder output corresponding to a first iteration and determining whether the decoder output satisfies the outer-loop stopping criterion further comprises:
   comparing the first decoder output corresponding to the first iteration with a second decoder output corresponding to a second iteration to obtain an accuracy improvement; and
   determining whether the outer-loop stopping criterion is satisfied based on whether the accuracy improvement exceeds a threshold.

9. The method of claim 1, wherein:
   at least one of the plurality of codewords is a retransmitted codeword, and
   the decoder output comprises information associated with previous transmissions of the at least one retransmitted codeword.

10. The method of claim 1, further comprising:
repeating the processing, the determining, and the cancelling until either the decoder output satisfies the outer-loop stopping criterion or a predetermined number of iterations have been performed.

11. A receiver for performing iterative interference cancellation in an outer, interference cancellation, loop that includes an iterative channel decoder that processes a plurality of codewords in an inner, decoding, loop, the receiver comprising:
storage circuitry configured to receive the plurality of codewords; and
control circuitry configured to:
process the plurality of codewords using the iterative channel decoder to obtain a decoder output, wherein the processing of the iterative channel decoder is performed until the processed plurality of codewords satisfies an inner-loop stopping criterion;
determine whether the decoder output satisfies an outer-loop stopping criterion;
cancel interference from the plurality of codewords based on the decoder output, in response to determining that the outer-loop stopping criterion is not satisfied.

12. The receiver of claim 11, wherein the control circuitry is further configured to cancel the interference from the plurality of codewords based on at least one of parallel interference cancellation or successive interference cancellation.

13. The receiver of claim 11, wherein the control circuitry is further configured to:
determine, based on a first decoder output of a first iteration, whether the inner-loop stopping criterion is satisfied; and
process the plurality of codewords using the iterative channel decoder in a second iteration to obtain a second decoder output, in response to determining that the inner-loop stopping criterion is not satisfied.

14. The receiver of claim 11, wherein the control circuitry is further configured to determine whether the decoder output satisfies the outer-loop stopping criterion by being configured to:
compute a plurality of aggregate decoding metrics for the plurality of received codewords; and
determine, based on the plurality of aggregate decoding metrics, whether the outer-loop stopping criterion is satisfied.

15. The receiver of claim 14, wherein the plurality of aggregate decoding metrics comprises at least one of mutual information metrics or log-likelihood ratio (LLR) magnitude values.

16. The receiver of claim 11, wherein the decoder output comprises a plurality of decoding metrics, and the control circuitry is further configured to determine whether the decoder output satisfies the outer-loop stopping criterion by being configured to:
compare the plurality of decoding metrics to one or more thresholds; and
determine that the outer-loop stopping criterion is satisfied if more than a predetermined number of the plurality of decoding metrics exceeds the one or more thresholds.

17. The receiver of claim 11, wherein the decoder output comprises a plurality of decoding metrics, and the control circuitry is configured to determine whether the decoder output satisfies the outer-loop stopping criterion by being configured to:
identify a decoding metric with maximum value among the plurality of decoding metrics; and
determine that the outer-loop stopping criterion is satisfied if the decoding metric with maximum value exceeds a predefined threshold.

18. The receiver of claim 11, wherein the decoder output is a first decoder output corresponding to a first iteration, and the control circuitry is further configured to determine whether the decoder output satisfies the outer-loop stopping criterion by being configured to:
compare the first decoder output corresponding to the first iteration with a second decoder output corresponding to a second iteration to obtain an accuracy improvement; and
determine whether the outer-loop stopping criterion is satisfied based on whether the accuracy improvement exceeds a threshold.

19. The receiver of claim 11, wherein:
at least one of the plurality of codewords is a retransmitted codeword, and
the decoder output comprises information associated with previous transmissions of the at least one retransmitted codeword.

20. The receiver of claim 11, wherein the control circuitry is further configured to:
repeat the processing, the determining, and the cancelling until either the decoder output satisfies the outer-loop stopping criterion or a predetermined number of iterations have been performed.

* * * * *